United States Patent
Noto

[11] Patent Number: 5,875,361
[45] Date of Patent: Feb. 23, 1999

[54] CAMERA WITH PARALLAX CORRECTING FUNCTION

[75] Inventor: Goro Noto, Tokyo, Japan

[73] Assignee: Canon Kabushiki Kaisha, Tokyo, Japan

[21] Appl. No.: 855,476

[22] Filed: May 13, 1997

[30] Foreign Application Priority Data

May 15, 1996 [JP] Japan ................................. 8-143464

[51] Int. Cl.$^6$ ........................... G03B 13/00; G03B 17/24
[52] U.S. Cl. ........................ 396/132; 396/377; 396/418
[58] Field of Search ................................ 396/132, 377, 396/418

[56] References Cited

U.S. PATENT DOCUMENTS 4,619,510  10/1986  Nakanishi ............................. 396/418
5,555,049  9/1996  Sugita .................................. 396/132
5,602,608  2/1997  Asakura et al. ..................... 396/132

FOREIGN PATENT DOCUMENTS 7-86631  10/1989  Japan .
3-92831  4/1991  Japan .

*Primary Examiner*—David M. Gray
*Attorney, Agent, or Firm*—Fitzpatrick, Cella, Harper & Scinto

[57] ABSTRACT

An apparatus, such as a camera, including a first drive power transmission system for transmitting drive power to a finder in order to correct parallax, a second drive transmission system for transmitting drive power to an operating device for operating the device, and a drive power supplying device for selectively supplying drive power to the first drive power transmission system and the second drive power transmission system.

28 Claims, 17 Drawing Sheets

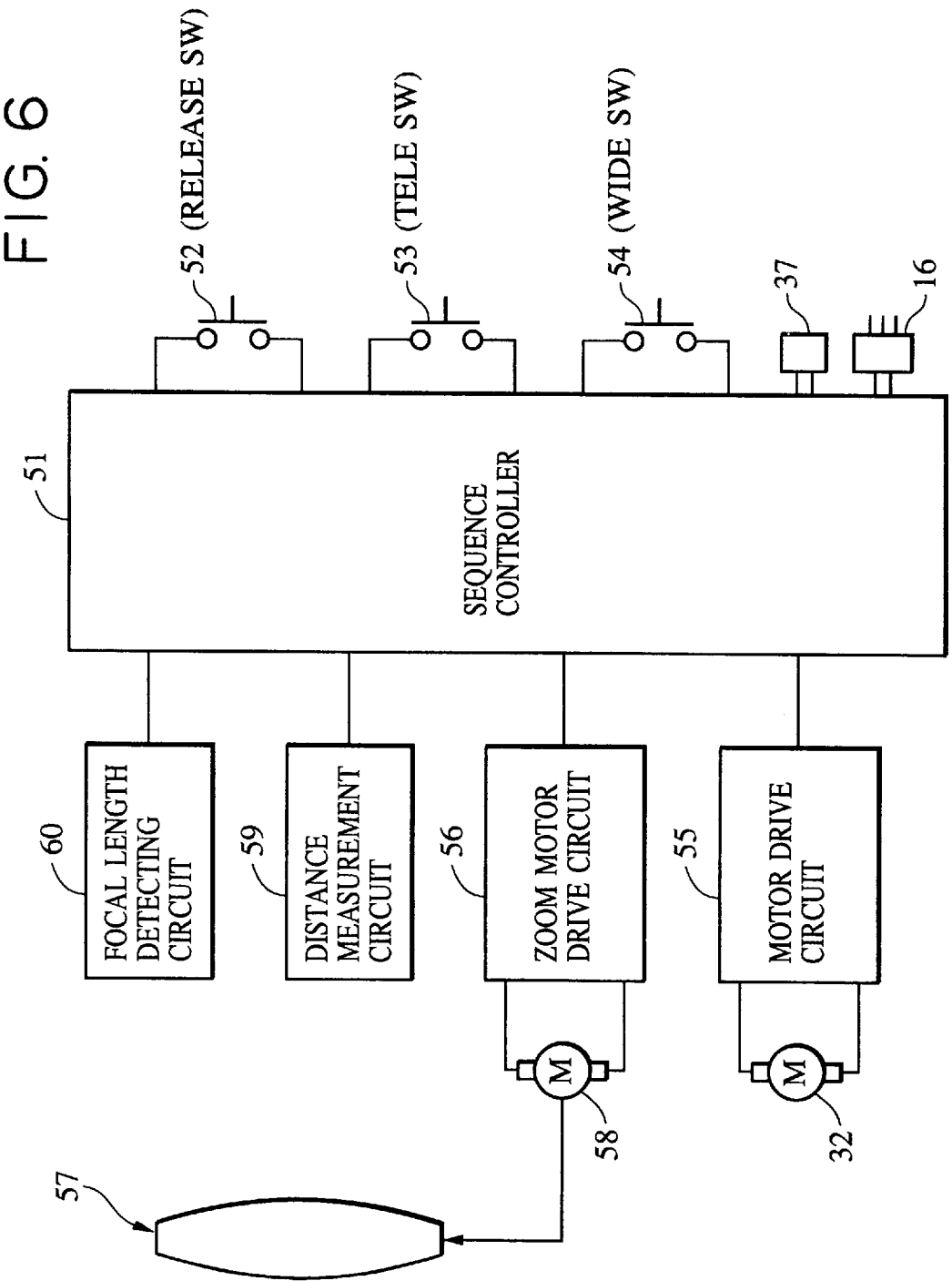

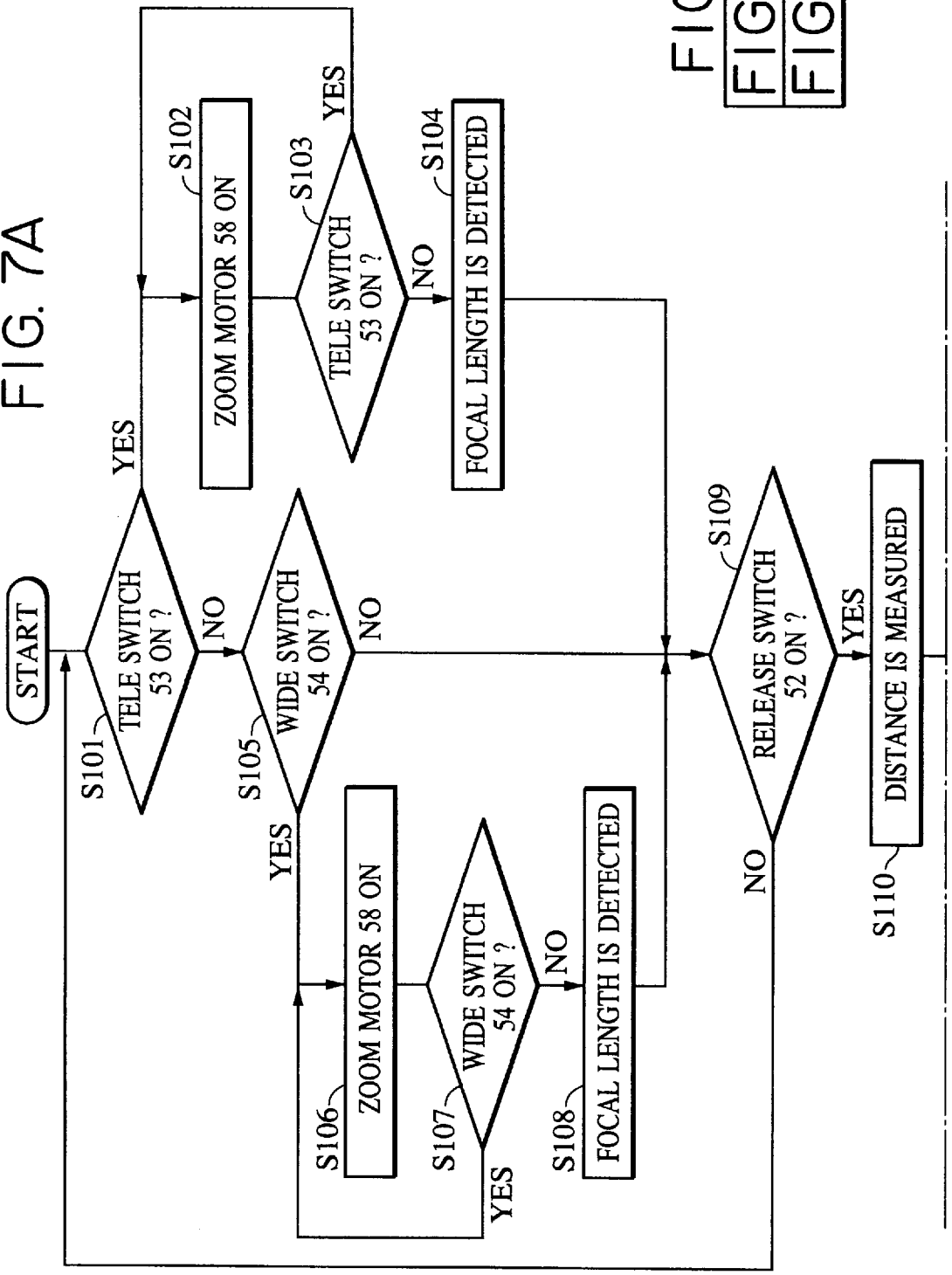

(PARALLAX AT POINT X)

(PARALLAX AT POINT Y)

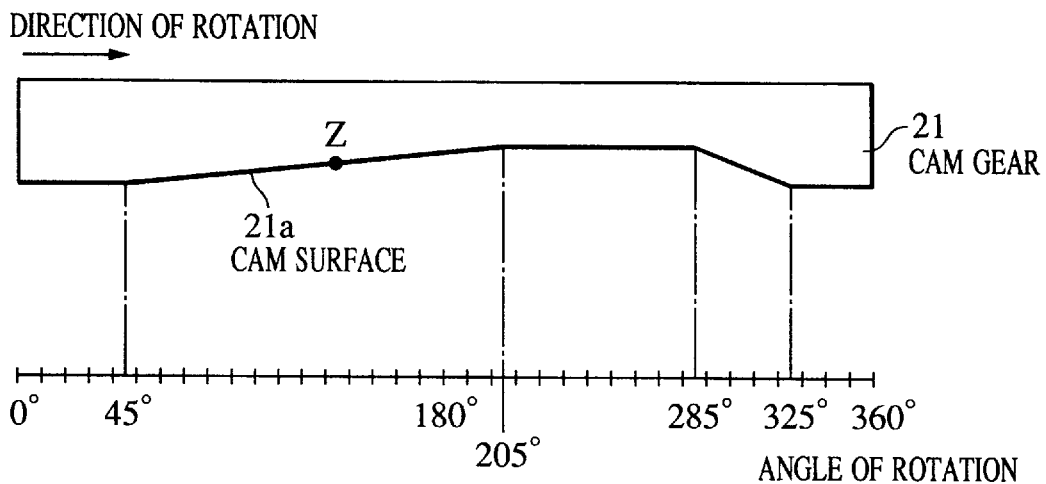
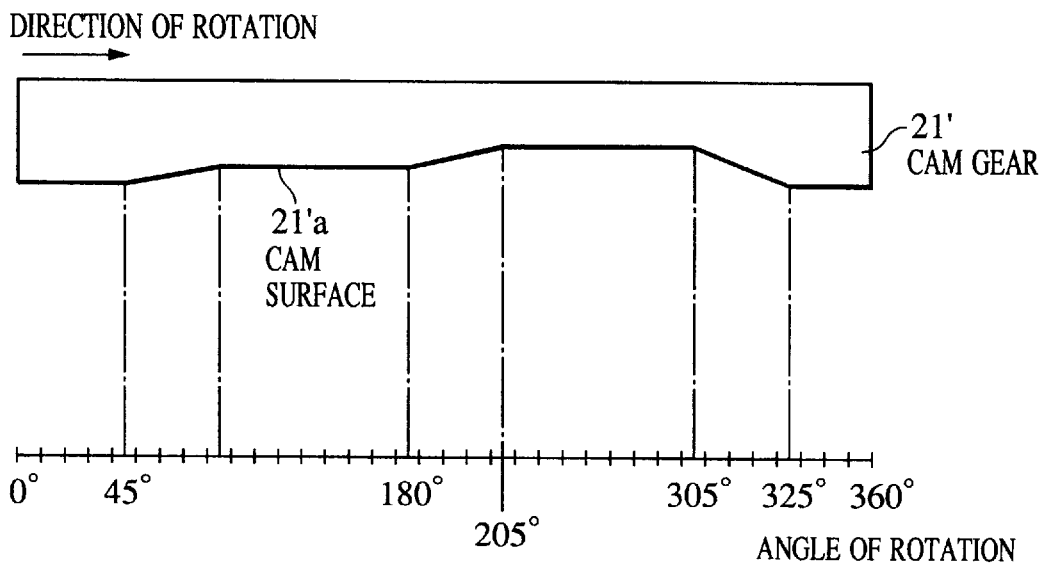

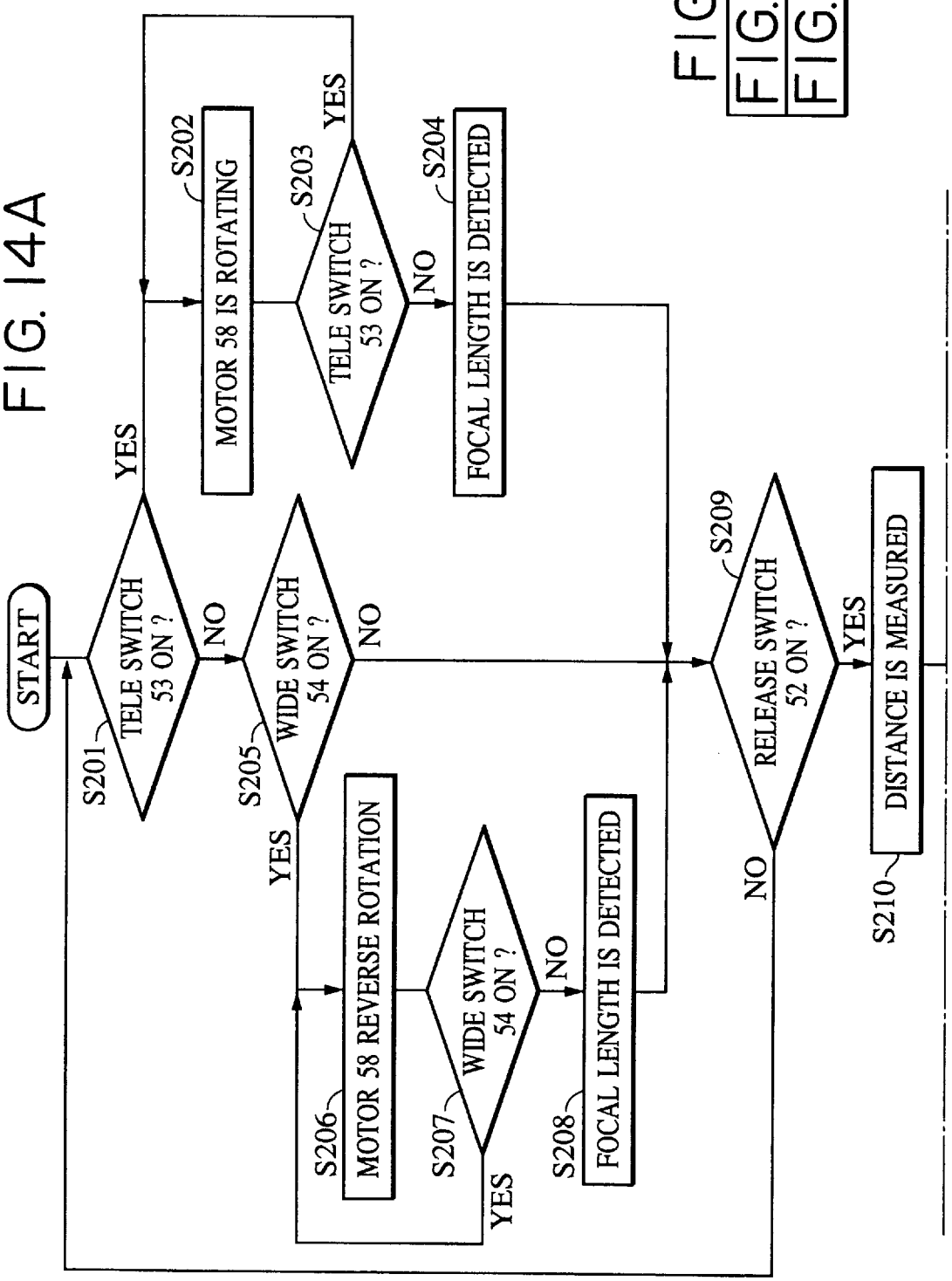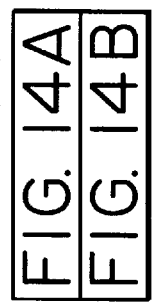

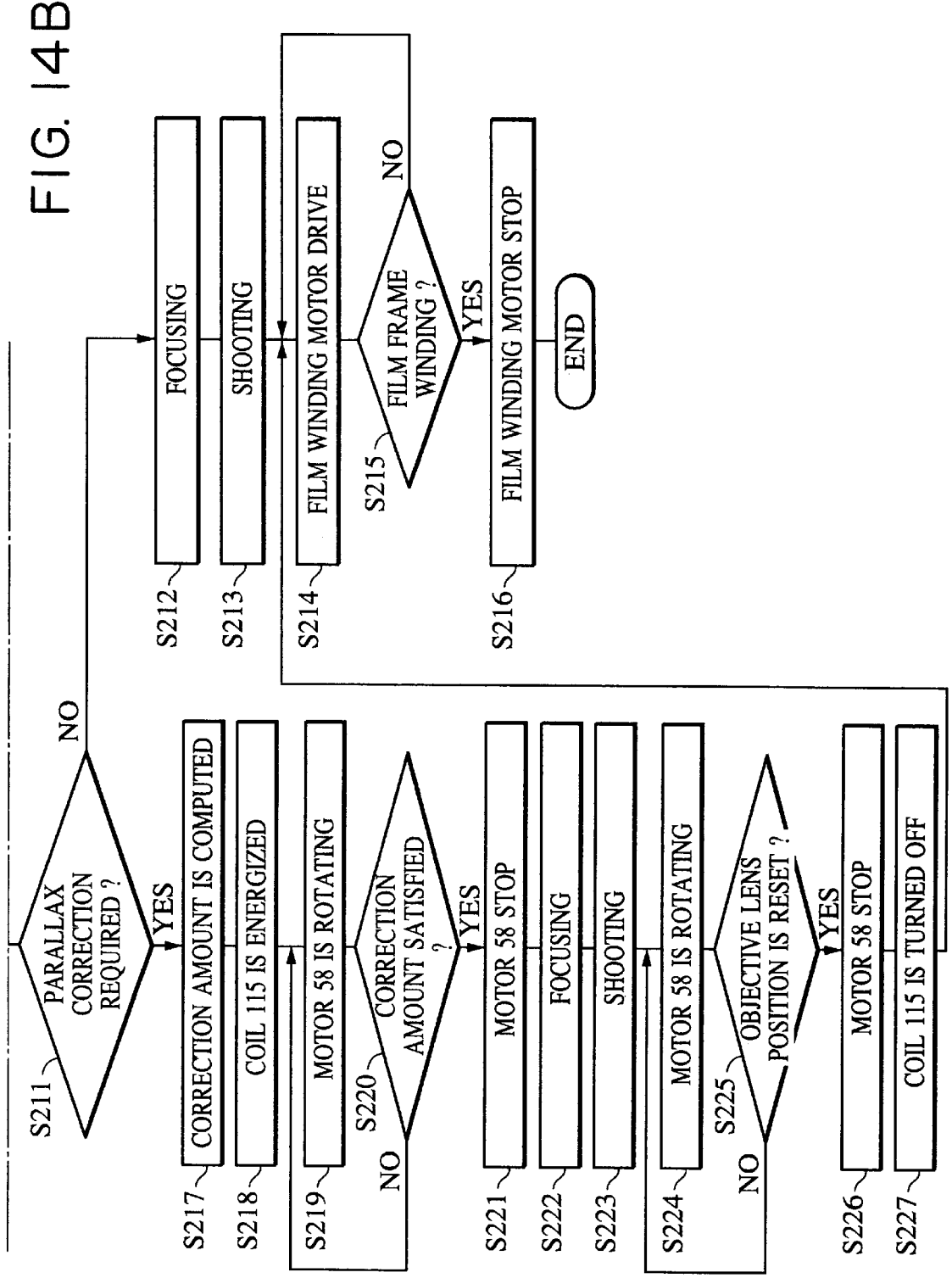

CAMERA WITH PARALLAX CORRECTING FUNCTION

BACKGROUND OF THE INVENTION

1. Field of the Invention

The present invention relates to an improvement in an apparatus, such as a camera, with a parallax correcting function, which is used to correct parallax of a finder for viewing an object through a light path which is different from the photographic light path.

2. Description of the Related Art

In general, a camera, such as a compact camera, which comprises a finder optical system used for viewing an object through a light path which is different from the photographic optical system light path, has a problem that the actual photographic range on the film surface and the range viewed by the photographer using a finder do not exactly match. This phenomenon is called parallax, and various measures have been conventionally proposed to correct this problem.

Such measures include providing a plurality of field of view frames for correcting parallax within the finder field of view to provide an index of parallax to the photographer, moving the finder field of view mask in accordance with a distance to be photographed, and displaying the field of view pattern on a liquid crystal display. In Japanese Examined Patent Publication No. 3-92831, parallax is corrected by using, as the finder optical system, a prism whose apex angle varies in accordance with a distance to be photographed.

In cameras which use a zoom optical system for the photographic lens, a zoom optical system is also commonly used for the finder in order to subject the finder to zooming with the zooming of the photographic lens. In such a case, parallax occurs not only when a distance to be photographed changes, but also when the finder optical system is subjected to zooming. Parallax becomes considerable, the higher the magnification of the zoom ratio. Japanese Examined Patent Publication No. 7-86631 discloses a camera construction in which the magnification change-over optical system is mechanically shifted with changes in the finder magnification (focal length).

In the camera disclosed in the aforementioned Japanese Examined Patent Publication No. 7-86631, parallax produced as the finder magnification changes can be corrected, but parallax produced as the distance to be photographed changes cannot be corrected. None of the conventionally proposed cameras are capable of correcting both the parallax produced with changes in the finder magnification and the parallax produced with changes in distance to the object to be photographed.

In view of the above-described problem, the applicant has disclosed, in Japanese Patent Application No. 8-35774, a camera which not only corrects parallax produced with changes in the finder magnification, but also parallax produced with changes in distance to the object to be photographed, which could not be corrected by the camera in the aforementioned Japanese Examined Patent Publication No. 7-86631. More specifically, the proposed camera is capable of correcting parallax produced between near distance photography and far distance photography.

The camera proposed in Japanese Patent Application No. 8-35774 has the problem of being large and costly, since another drive source needs to be specially provided for parallax correction.

SUMMARY OF THE INVENTION

According to one aspect of the invention, there is provided an apparatus, such as a camera, comprising a first drive power transmission system for transmitting drive power to a finder in order to correct parallax, a second drive power transmission system for transmitting power to an operating device for operation, and a drive power supplying device for selectively supplying drive power to the first drive power transmission system and the second drive power transmission system. The apparatus is capable of correcting finder parallax without a drive source provided specially for finder parallax correction, so that parallax can be corrected at a lower cost and without increasing the apparatus size.

Other aspects of the invention will become apparent from the preferred embodiments described below.

BRIEF DESCRIPTION OF THE DRAWINGS

FIG. 6 is a block diagram showing the construction of the main portion of the camera of Embodiment 1 in accordance with the present invention.

FIG. 10 is a view illustrating the form of the cam surface of the cam gear and the angle of rotation at the time of parallax correction.

FIG. 11 is a view of a cam gear having a form which is different from that of the cam gear of FIG. 10.

FIG. 14, comprised of FIGS. 14A and 14B, is a flowchart showing the operations of the camera of Embodiment 2 in accordance with the present invention.

DESCRIPTION OF THE PREFERRED EMBODIMENTS

A description will now be given of the preferred embodiments of the present invention, with reference to the drawings.

Figure 1:
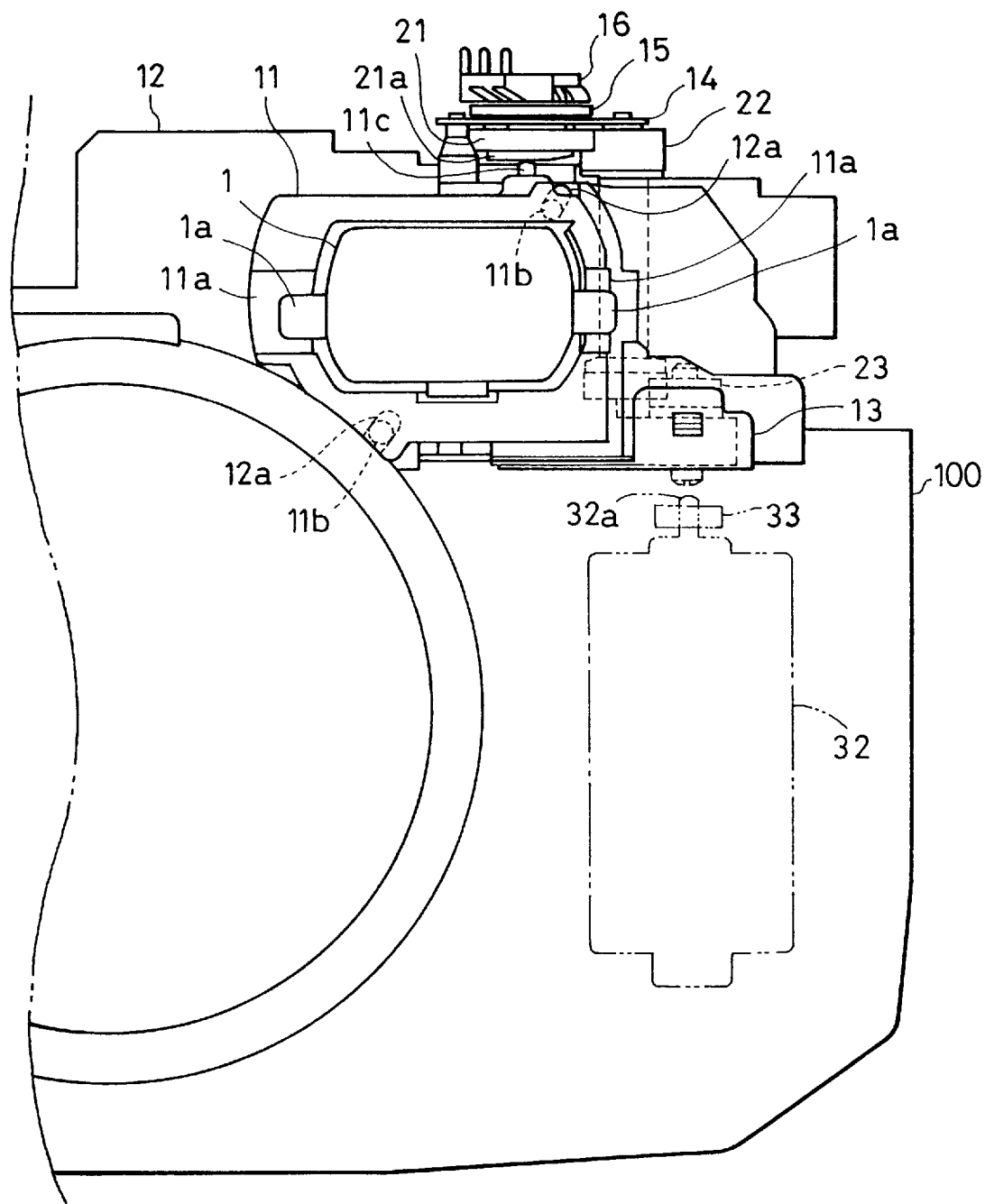
FIG. 1 is a structural front elevational view of the main portion of a camera of Embodiment 1 in accordance with the present invention.
Figure 2:
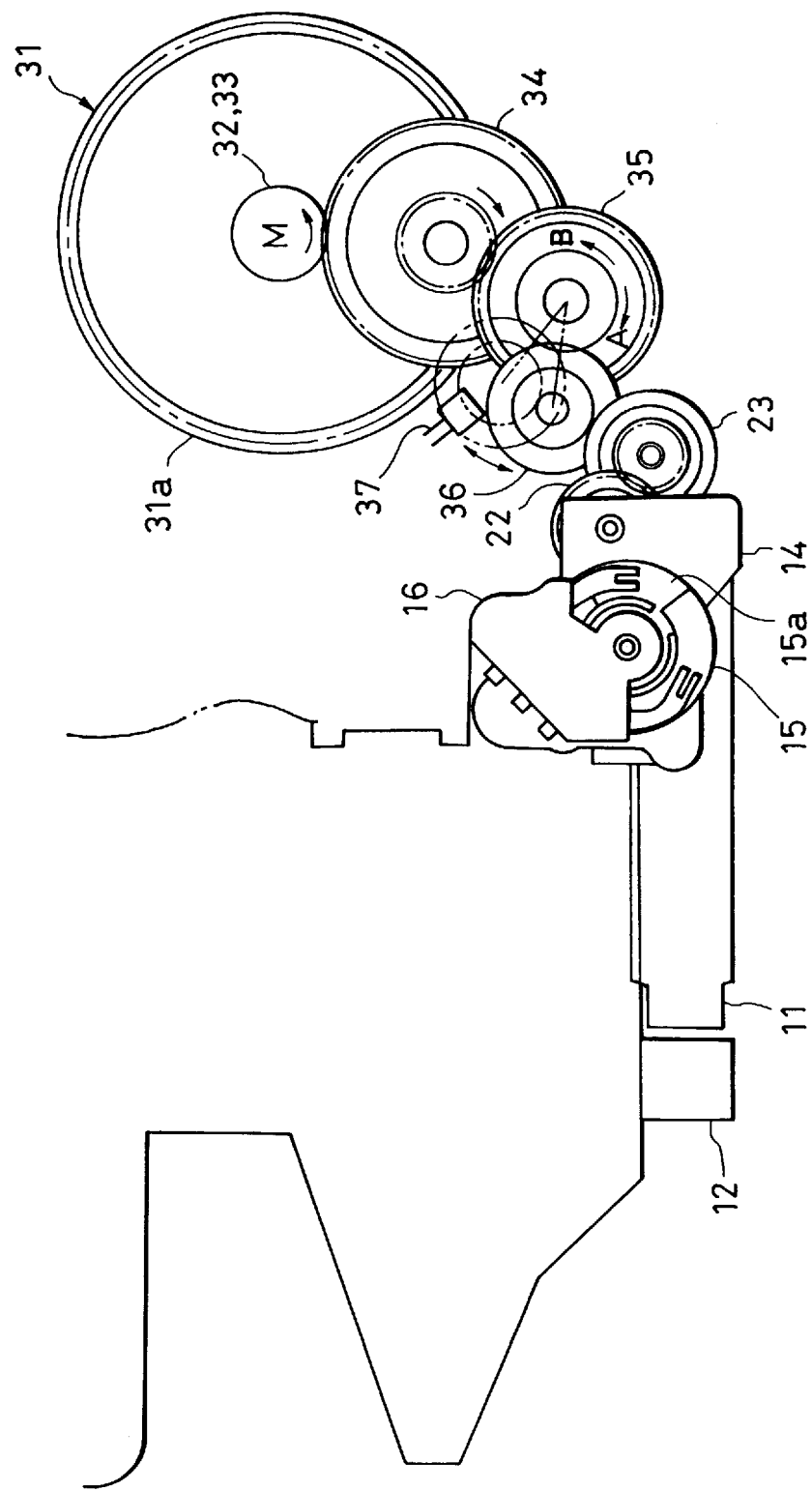
FIG. 2 is a structural plan view of the main portion of the camera of Embodiment 1 in accordance with the present invention.
Figure 3:
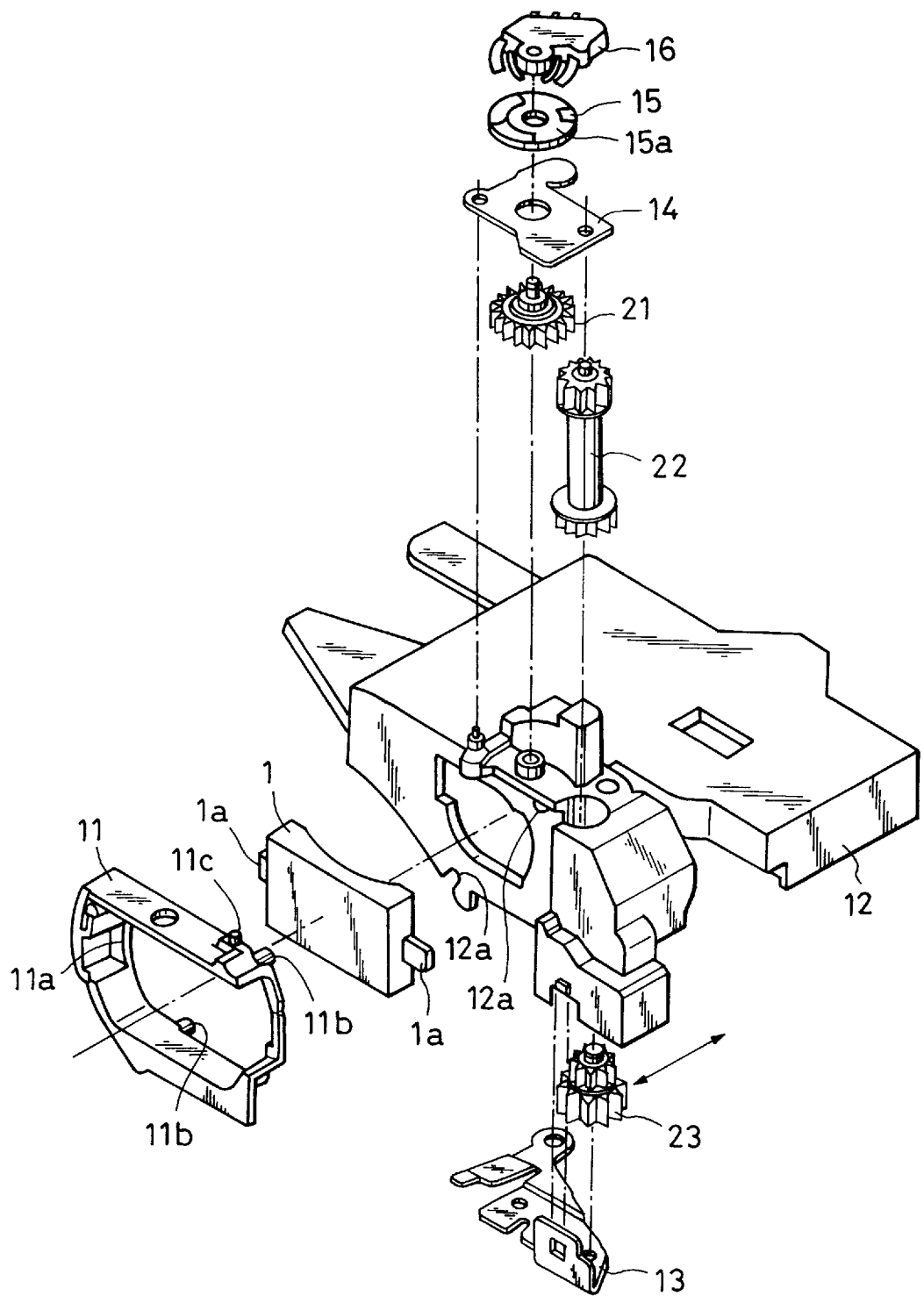
FIG. 3 is a structural perspective view of the main portion of the camera of Embodiment 1 in accordance with the present invention.

FIGS. 1 to 3 are views showing the main portion of the mechanical structure of the camera of Embodiment 1 in accordance with the present invention. More specifically, FIG. 1 is a structural front elevational view of the camera. FIG. 2 is a structural plan view of the main portion of the same. FIG. 3 is a structural perspective view of the main portion of the same.

Referring to the figures, the objective lens 1, being one structural component of the finder optical system, is held by a lens holder 11 having recesses 11a (FIG. 1) for placing therein a pair of flanges 1a of the objective lens 1. The lens holder 11 is movably held by a finder base 12 which holds an optical system other than the aforementioned objective lens 1 optical system, such as a zoom lens optical system (described later). In addition, the lens holder 11 has a protrusion 11b (FIG. 1) for guiding the holder 11 when it is moving. The protrusion 11b engages the guide groove 12a of the finder base 12. Further, the lens holder 11 is biased upward (in FIG. 1) by a leaf spring 13 mounted to the finder base 12, so that the cam pin 11c of the lens holder 11 and the cam surface of a cam gear 21 having a cam portion 21a are in constant contact with each other.

The cam gear 21 is controlled in the direction of thrust by a holding plate 14 mounted to the finder base 12. A substrate 15 (FIG. 2), having formed thereon a pattern 15a used for detecting the amount of rotation of the cam gear 21, is provided coaxially with the cam gear 21 so as to be integrally rotatable with the cam gear 21. The pattern 15a is read by a brush member 16 mounted to the finder base 12.

The cam gear 21 engages a linking gear 22 having gear portions on both ends of the axis and engaging a stepped gear 23. As shown in FIG. 1, a film-winding motor 32 is contained in a film-winding spool 31 in a camera body 100. A pinion gear 33 is integrally mounted to an output shaft 32a of the motor 32. Accordingly, when the film-winding motor 32 is driven, the output shaft 32a thereof and the pinion gear 33 rotate unidirectionally, generating power which is transmitted to a gear 35 through a gear 34. The gear 35 and a gear 36 form a known planetary mechanism, with the gear 35 being the sun gear and the gear 36 being the planetary gear.

Accordingly, when the gear 35 rotates clockwise in the direction of arrow A in FIG. 2, the gear 36 revolves clockwise around the axis of center of rotation of the gear 35, causing the gear 36 to engage the gear portion 31a of the film-winding spool 31. Then, after power transmission to the film-winding spool 31, the gear 35 rotates counterclockwise in the direction of arrow B in FIG. 2, causing the gear 36 to revolve counterclockwise around the axis of center of rotation of the gear 35, and engage the stepped gear 23, followed by transmission of power to the stepped gear 23.

Reference numeral 37 in FIG. 2 designates a switch of, for example, a photointerrupter, used for detecting the position of the gear 36.

Figure 4:
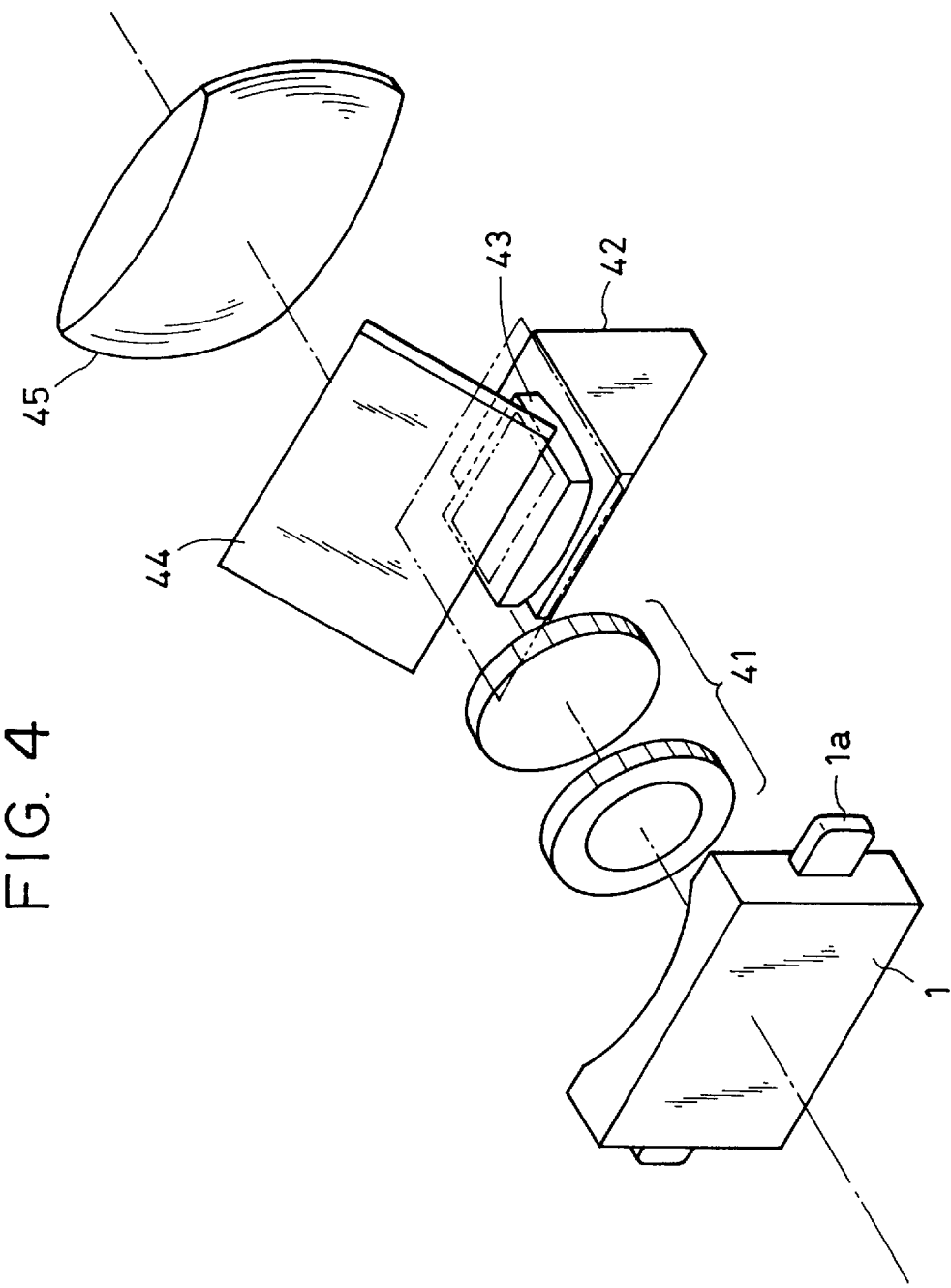
FIG. 4 is a perspective view of the finder optical system of the camera of Embodiment 1 in accordance with the present invention.
Figure 5:
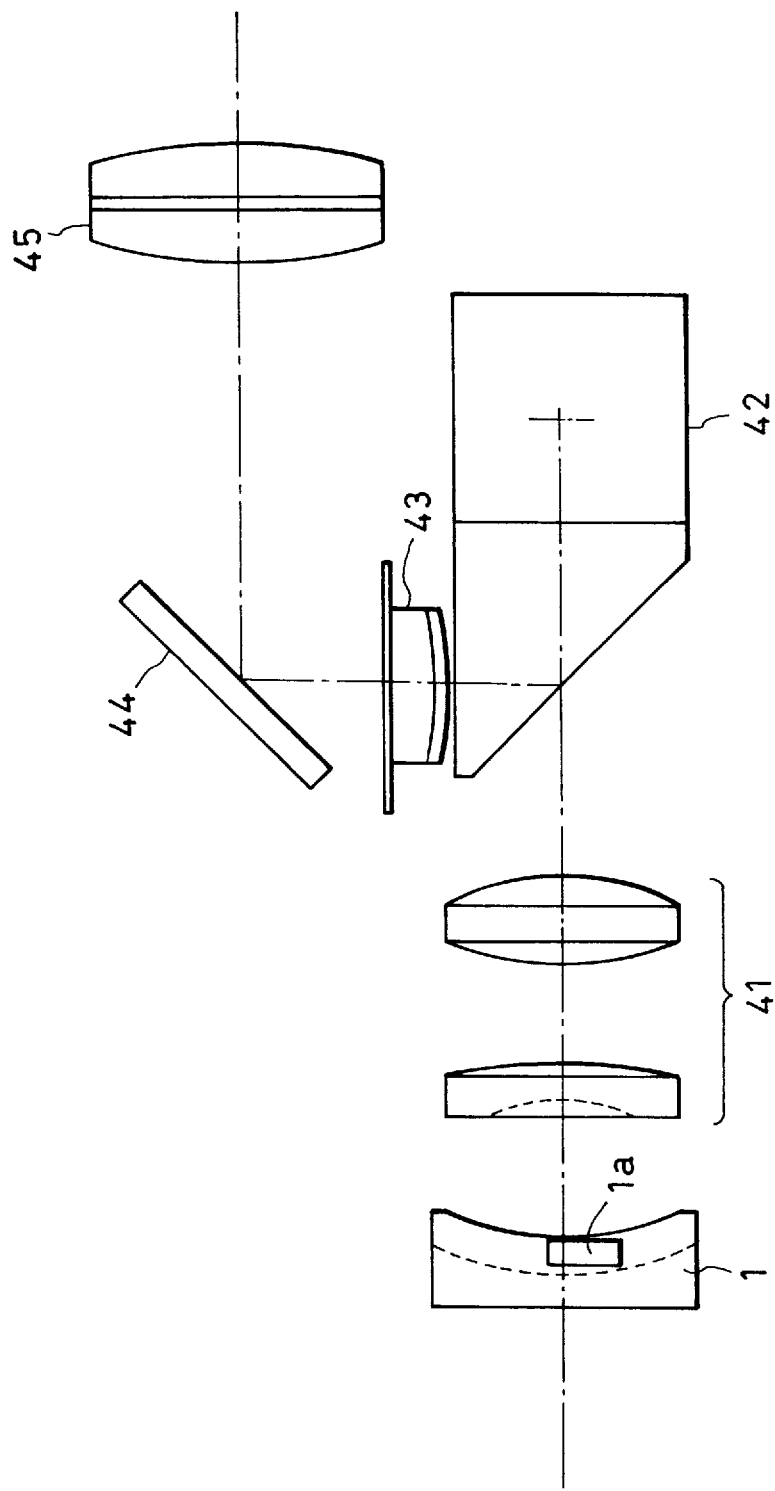
FIG. 5 is a side view of the finder optical system of the camera of Embodiment 1 in accordance with the present invention.

FIGS. 4 and 5 are perspective views of the finder optical system of the camera having the above-described construction. Referring to the figures, reference numeral 41 denotes a zoom lens for changing the magnification of the finder, reference numeral 42 denotes a prism, reference numeral 43 denotes an image-forming lens, reference numeral 44 denotes a reflecting mirror, and reference numeral 45 denotes an eyepiece. The objective optical system extends from the objective lens 1 to the image-forming lens 43.

FIG. 6 is a block diagram which schematically shows the electrical construction of the camera having the above-described structure. Corresponding component parts to those of FIGS. 1 to 3 are given the same reference numerals.

Referring to FIG. 6, reference numeral 51 denotes a sequence controller, constructed by a microcomputer or the like, which functions to control the sequence of the entire camera, reference numeral 52 denotes a release switch which is turned on by the operation of a shutter release member (not shown), reference numeral 53 denotes a TELE switch used for commanding zooming in the telephoto direction, and reference numeral 54 denotes a WIDE switch used for commanding zooming in the wide angle direction. (Telephoto is hereinafter referred to as "TELE" and wide angle is hereinafter referred to as "WIDE".) Reference numeral 55 denotes a motor drive circuit used for driving the above-described film-winding motor 32, reference numeral 56 denotes a zoom motor drive circuit used for driving a zoom motor 58 for zooming a photographic lens device 57 composed of one or more lenses in the TELE direction or the WIDE direction, and reference numeral 59 denotes a distance measurement circuit for measuring the distance to the object based on a signal from a distance measurement sensor (not shown). Reference numeral 60 denotes a focal length detecting circuit for determining the focal length of the photographic lens 57 by detecting the position of the photographic lens 57 which has moved due to zooming by a known means such as a brush (not shown).

Figure 7B:
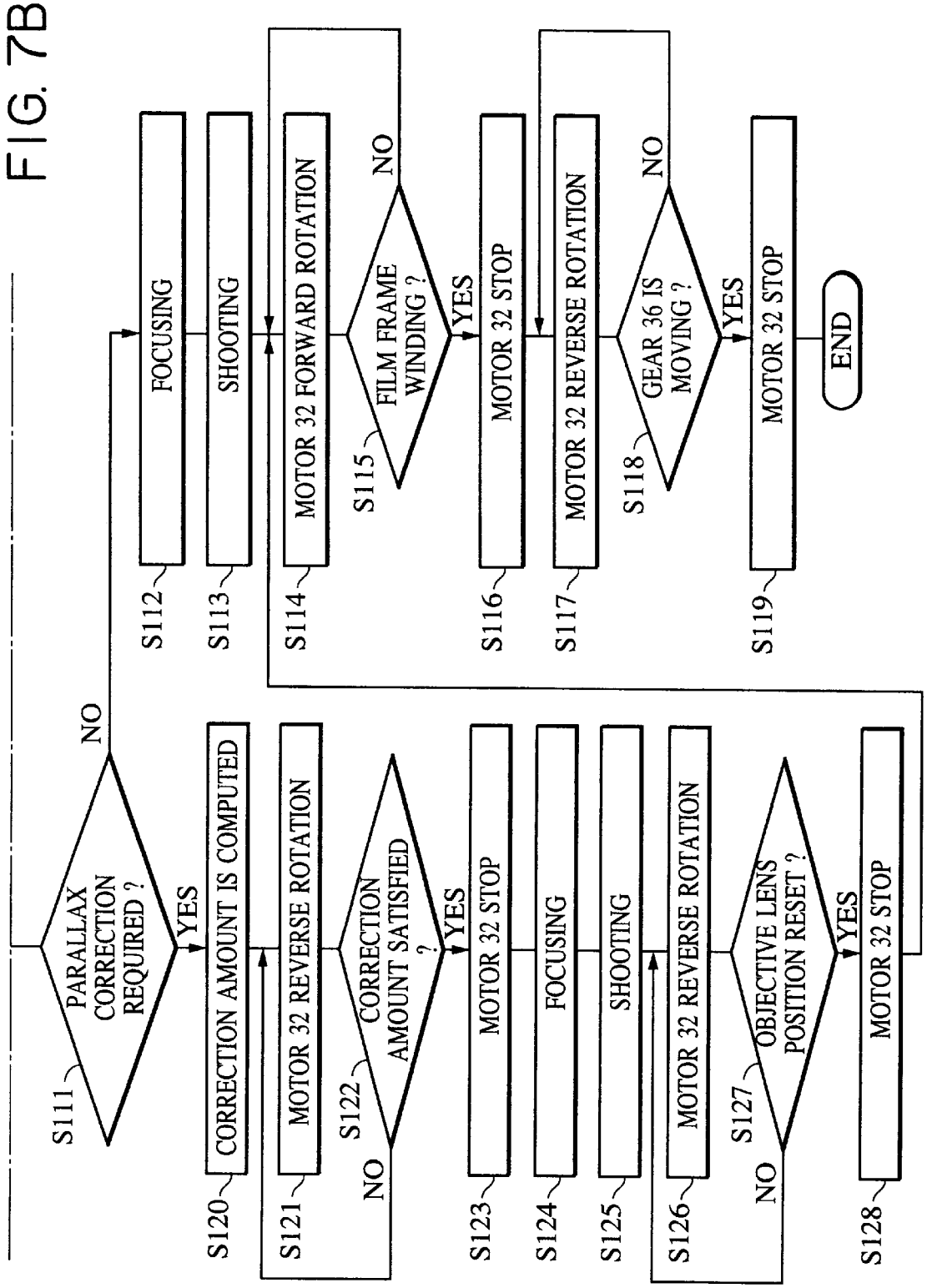
FIG. 7, comprised of FIGS. 7A and 7B, is a flowchart showing the operations of the camera of Embodiment 1 in accordance with the present invention.

A description will now be given of the operations of the camera having the above-described construction, with reference to the flowchart of FIG. 7.

In Step S101, the sequence controller 51 judges whether or not the TELE switch 53 is on. If it is on, the operation proceeds to Step S102 in order to drive the zoom motor 58 through the zoom motor drive circuit 56, whereby (the zoom optical system of) the photographic lens 57 starts to move in the TELE direction. At this time, the zoom lens 41 is also moved mechanically with the movement of the photographic lens 57 in order to change the finder angle of view to a TELE finder angle of view. Then, in Step S103, the state of the TELE switch 53 is checked. If the TELE switch 53 is still on, the operation returns to Step S102 in order to continue driving of the photographic lens 57 in the TELE direction. Thereafter, when it is detected that the TELE switch 53 has been turned off, the operation proceeds from Step S103 to Step S104 in order to detect the focal length position of the photographic lens 57 through the focal length detecting circuit 60. Then, the operation proceeds to Step S109.

When, in Step S101, the sequence controller 51 judges that the TELE switch 53 is not turned on, the operation proceeds to Step S105 to judge whether or not the WIDE switch 54 is turned on. If the WIDE switch 54 is turned on, the operation proceeds to Step S106 in order to drive the zoom motor 58 through the zoom motor drive circuit 56 and to thereby start driving of the photographic lens 57 in the WIDE direction. As with the case of driving the photographic lens 57 in the TELE direction, the zoom lens 41 is moved with the movement of the photographic lens 57 in order to change the finder angle of view to a wide angle of view. Thereafter, in Step S108, the state of the WIDE switch 54 is checked. If the WIDE switch 54 is still on, the operation returns back to Step S106 in order to continue driving of the photographic lens 57 in the WIDE direction. Thereafter, when it is detected that the WIDE switch 54 is off, the operation proceeds from Step S107 to Step S108 in order to detect the focal length position of the photographic lens 57 through the focal length detecting circuit, after which the operation proceeds to Step S109.

Upon completion of the above-described steps, the desired angle of views are obtained.

In Step S109, the state of the release switch is checked. If it is not turned on, the operation returns to Step S101 in order to repeat the above-described operations. If the release switch 52 is turned on, the operation proceeds to Step S110 in order to determine the object distance by the distance measurement circuit 59 and to thereby input the determined distance to be photographed (object distance) into the sequence controller 51. Then, in Step S111, a determination is made as to whether or not parallax correction is required based on the obtained focal lengths and the distance to be photographed.

The parallax correction, which depends on the combination of the selected focal length and the object distance, is described with reference to FIGS. 8 and 9.

Figure 8:
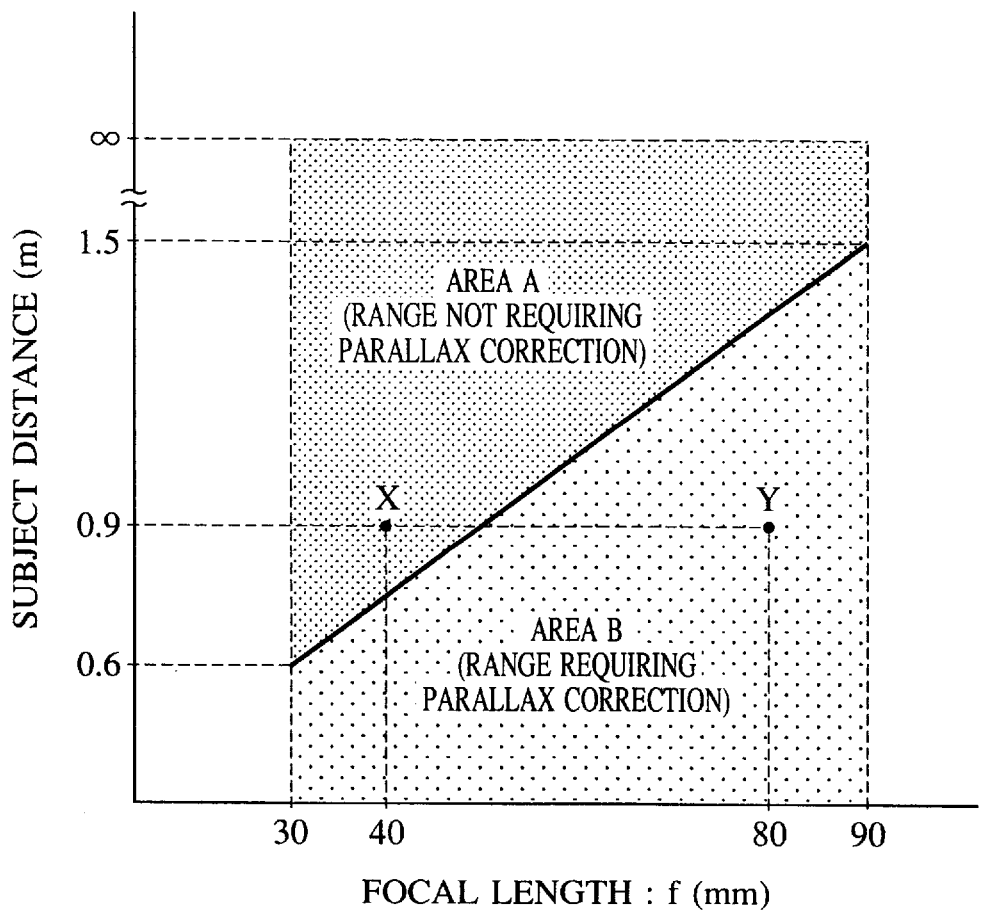
FIG. 8 is a diagram showing whether or not parallax correction is required for a combination of focal length and object distance in the camera of Embodiment 1 in accordance with the present invention.

A description of parallax correction is given in the case where the combination of the focal distance and the object distance are such that a projection line from the object distance on the vertical axis and a projection line from the focal length on the horizontal axis meet at a point within area A in FIG. 8. Here, the focal length is 40 mm, and the object distance is 0.9, and the projection lines meet at point X.

Figure 9A:
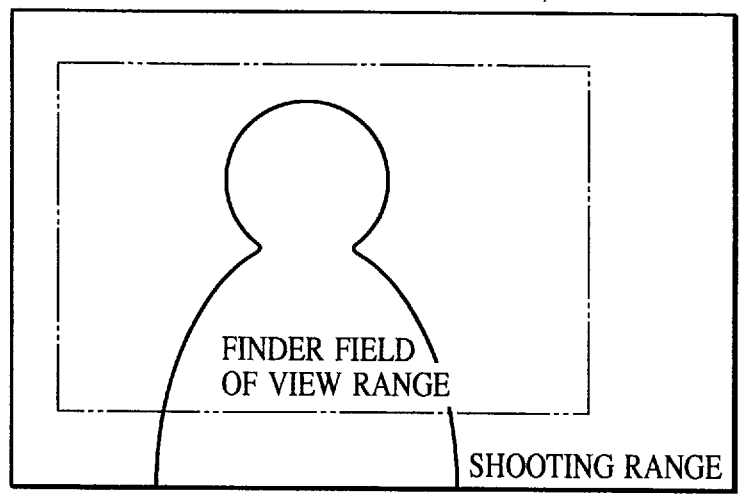
FIGS. 9A and 9B are views showing the finder field of view range and the photographic range at point X and at point Y, respectively.

In this case, photographic operation is not influenced by parallax between the photographic system and the finder system. More specifically, as shown in FIG. 9A, the entire field of view range of the finder is contained within the object photographic range, so that the entire image within the field of view is photographed.

Therefore, it is not necessary to correct parallax, so that the operation proceeds from Step S111 to Step S112. Here, (the focusing optical system of) the photographic lens 57 is moved to perform focusing. Then, in Step S113, a shutter mechanism (not shown) is operated for photography.

Thereafter, in Step S114, the motor 32 starts to rotate clockwise in the forward direction through the motor drive circuit 55.

The rotation causes clockwise rotation of the pinion gear 33 along with the output shaft 32a of FIG. 2, causing clockwise rotation of the gear 35 through the gear 34 in the direction of arrow A of FIG. 2. Therefore, the gear 36 revolves clockwise around the axis of the center of rotation of the gear 35 and engages the gear portion 31a of the film-winding spool 31, causing the film-winding spool 31 to rotate thereafter. That is, a film (not shown) is wound by the film-winding spool 31.

In Step S115, when a detection is made that an amount of film corresponding to one frame has been fed using a film detecting switch (not shown) of, for example, a known photo-reflector for detecting perforations of a film, the operation proceeds to Step S116 in order to stop the rotation of the motor 32 through the motor drive circuit 55, whereby film feeding is stopped. Then, in Step S117, the motor 32 starts to rotate counterclockwise, which causes the gear 35 to also rotate counterclockwise in the direction of arrow B in FIG. 2, so that the gear 36 revolves counterclockwise around the center of rotation of the gear 35 and engages the stepped gear 23. At this time, the movement of the gear 36 can be detected using the switch 37. Accordingly, when this detection is made in Step S118, the operation proceeds to Step S119 in order to stop the rotation of the motor 32, whereby the photographic operations are completed.

The gear 36 is set so as to be in engagement with the stepped gear 23 to prevent release time lag, which results when the parallax correction gear row and the motor 32 row must be brought into engagement every time it becomes necessary to perform parallax correction upon operation of the release switch 52 to photograph the next frame.

A description will now be given of the case where the combination of the focal distance and the object distance are such that a projection line from the object distance on the vertical axis and a projection line from the focal length on the horizontal axis meet at a point within area B of FIG. 8. (The focal length is 80 mm, and the object distance is 0.9 m, and the projection lines meet at point Y.) In this case, parallax correction is required in Step S111.

Figure 9B:
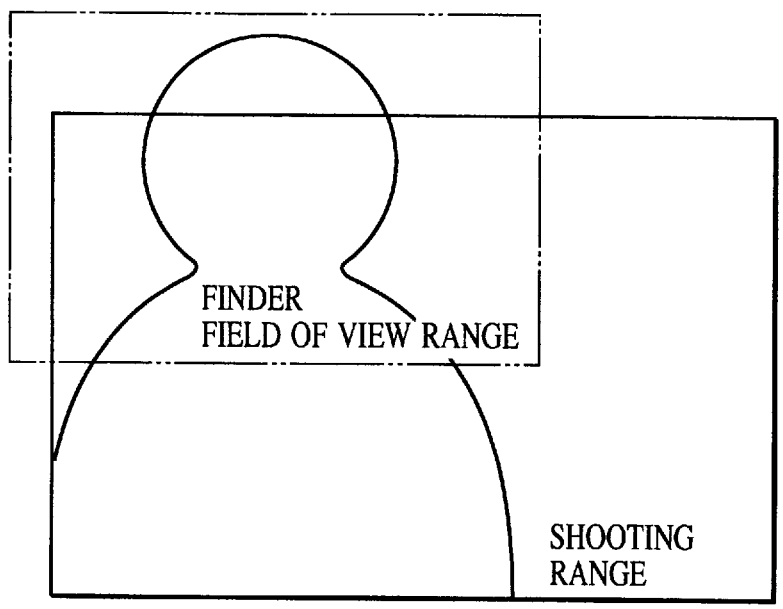

In this case, as shown in FIG. 9B, the parallax between the photographic system and the finder system causes the finder field of view range to be located partly outside the object photographic range, so that the photographer, intending to get a close-up photograph of a person within the finder field of view, actually gets a printed photograph with part of the head of the photographed person cut off.

Therefore, in this case, it is necessary to correct for parallax of the finder system, so that the operation proceeds from Steps S111 to S120 in order to compute a suitable parallax correction amount for the point Y using a ROM in the sequence controller 51. The ROM pre-stores the relationship between the combination of focal lengths and the object distances and the parallax correction amounts.

Then, in Step S121, the motor 32 starts to rotate counterclockwise through the motor drive circuit 55.

This causes the pinion gear 33 to rotate clockwise along with the output shaft 32a of FIG. 1, which causes the gear 35 to rotate counterclockwise in the direction of arrow B of FIG. 2 through the gear 34. At this time, the gear 36 engages the stepped gear 23 (upon photographic operation, the parallax correction gear row and the motor 32 gear row are in engagement to eliminate the problem of release time lag, as described above), so that the linking gear 22 rotates immediately, which generates power which is transmitted to the cam gear 21 illustrated in FIGS. 1 and 3 to rotate it.

As the cam gear 21 rotates, the biasing force of the leaf spring 13 causes the lens holder 11 to shift upward and toward the right in FIG. 10 as a result of being guided by the guide groove 12a, while the cam pin 11c of the lens holder 11 is in contact with the cam surface 21a. Since the objective lens 1 is also shifted upward and toward the right in a similar fashion, the parallax is gradually corrected as the finder field of view range moves downward and toward the right. When the cam gear 21 rotates further, and the cam pin 11c comes to point Z (FIG. 10) which corresponds to the desired amount of parallax correction, that is, when the parallax is corrected so that the finder field of view range which was located partly outside the photographic range as shown in FIG. 9B is now contained completely within the photographic range as shown in FIG. 9A, the pattern 15a is read by the brush member 16 to obtain the rotational position of the cam gear 21, so that the sequence controller 51 can detect the arrival of the cam pin 11c to Point Z. This detection is performed in Step S122. When, in this step, it is detected that the cam pin 11c has reached point Z which corresponds to the desired amount of parallax correction, the operation proceeds to Step S123 in order to stop the rotation of the motor 32 through the motor drive circuit 55 and thus, the shifting of the objective lens 1, whereby the parallax correction is completed.

Then, in Step S124, the photographic lens 57 is moved to perform focusing. In the next Step S125, the shutter mechanism (not shown) is operated to execute a photographic operation.

In Step S126, the motor 32 is rotated once again counterclockwise via the motor drive circuit 55 in order to rotate the cam gear 21 once again in the same direction.

This causes the cam pin 11c to move to the right in FIG. 10 along the cam surface 21a, so that the lens holder 11 shifts further upward and to the right (in FIG. 1). In FIG. 10, when the cam pin 11 is in contact with a flat portion of the cam surface 21a when the angle of rotation is in the range of 205° to 285°, the object lens 1 stops shifting upwardly and to the right. On the other hand, when the cam gear 21 rotates further to an angle of 285° to 325° so that the cam pin 11c contacts the taper of the cam surface 21a, the lens holder 11 opposes the biasing force of the leaf spring 13 due to the action of the cam surface 21a to return back to its initial position before parallax correction by being shifted downward and to the left in FIG. 1.

The sequence controller 51 reads the rotational position of the cam gear 21 by the brush member 16 as described above, so that when, in Step S127, a detection is made that the objective lens 1 has been reset to its initial position, the operation proceeds to Step S128. In Step S128, the rotation of the motor 32 is temporarily stopped via the motor drive circuit 55, and immediately thereafter, the operation proceeds to Step S114 in order to switch the direction of rotation of the motor 32 from counterclockwise to clockwise.

This causes the gear 36 to revolve clockwise around the axis of the center of rotation of the gear 35 via the pinion gear 33, the gear 34, and the gear 35, and to engage the gear portion 31a of the film-winding spool 31, causing a photographic frame (not shown) to be wound up by the film-winding spool 31, as described above.

Thereafter, as described above, when, in Step S115, a detection is made that an amount of film corresponding to one frame has been fed by means of a film detection switch (not shown), the operation proceeds to Step S116 to stop the rotation of the motor 32 via the motor drive circuit 55, as a result of which, the film feeding is stopped. Then, in Step S117, the motor 32 is this time rotated counterclockwise via the motor drive circuit 55 in order to engage the gear 36 with the stepped gear 23. When a detection is made in Step S118 that the gear 36 has engaged the stepped gear 23 by means of the switch 37, the operation proceeds to Step S119 in order to stop the rotation of the motor 32 and thus, the photographic operations.

In the first embodiment of the invention, the amount of rotation of the cam gear 21, that is, the shifting amount of the objective lens 1, can be determined, based on the focal length and the distance to the object to be photographed (object distance), so that the parallax which occurs as the finder magnification changes and the parallax which occurs as the distance to the object to be photographed changes can be corrected at the same time.

In addition, by virtue of the planetary gear mechanism, power is received from the film-winding motor 32, thereby eliminating the need for a separate power source specifically provided for parallax correction, and thus, reducing costs and saving space.

Further, the parallax correction gear row and the motor 32 gear row are always in engagement, when the photographer is operating the release switch 52, so that release time lag resulting from operation almost never occurs.

The number of gear steps and the number of gears, the linking method, and so forth and are not limited to those in the foregoing description, so that any number of gear steps, number of gears, and linking method may be used in accordance with the layout of the camera.

Although in the foregoing description, the cam surface of the cam gear 21 varies continuously, similar effects may be obtained when a stepped cam (FIG. 11) with two or more steps is used. In this case, it is obvious that the substrate pattern formed integrally with a cam gear 21' is formed in correspondence thereto.

Still further, although in the foregoing description the film-winding motor 32 was used as the power source, the power source is not limited thereto. Therefore, the motor serving as a driving source before operation of the release switch 52 by the photographer, that is, during photographic preparation operations, may be used as the parallax correction power source.

In Embodiment 1, the photographic preparation operation (film wind-up operation) was performed by rotating the motor in the forward direction, and the parallax correction was performed by rotating the motor in the reverse direction. In Embodiment 2, a motor which can be rotated both in the forward and reverse directions for zooming of a photographic lens will be used. The power generated thereby is divided to make possible parallax correction.

Figure 12:
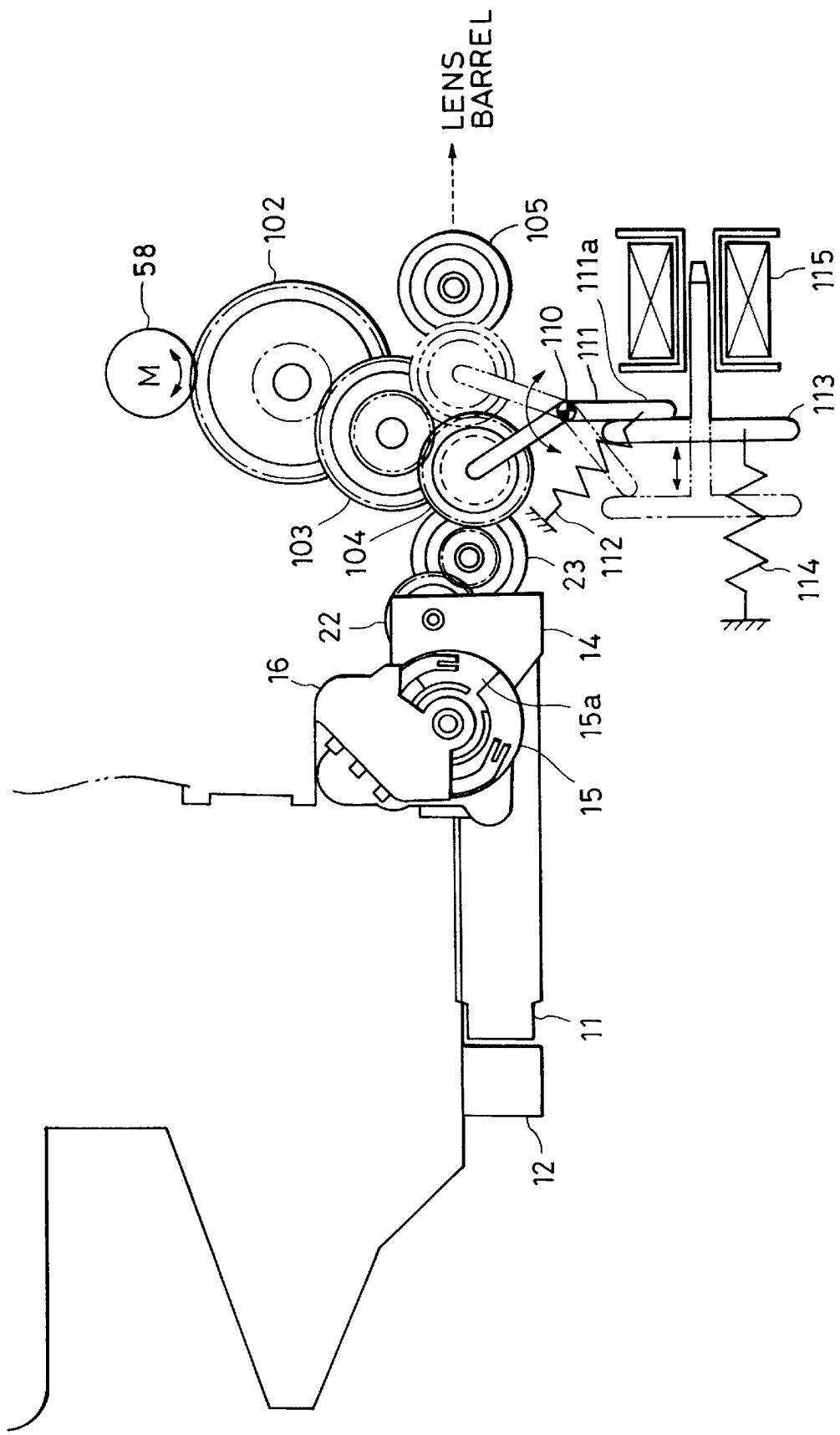
FIG. 12 is a structural plan view of the main portion of a camera of Embodiment 2 in accordance with the present invention.

FIG. 12 is a structural plan view of the main portion of a camera of Embodiment 2 in accordance with the present invention. Corresponding parts to those of Embodiment 1 will be given the same reference numerals, and their descriptions will not be given below.

Referring to FIG. 12, before a photographic operation, the power of the zooming motor 58 is transmitted to a lens barrel through gears 102, 103, 104, 105, etc., for use in zooming of the photographic lens.

The gear 104 is integrally formed with a lever 111 which rotates around a shaft 110 as center and which is biased clockwise in FIG. 12 by a spring 112. One end 111a of the lever 111 is in contact with a plunger 113 which is biased toward the left in FIG. 12 by a spring 114 and which can plunge into and plunge back out of a coil 115 as a result of energizing and de-energizing the coil 115.

Figure 13:
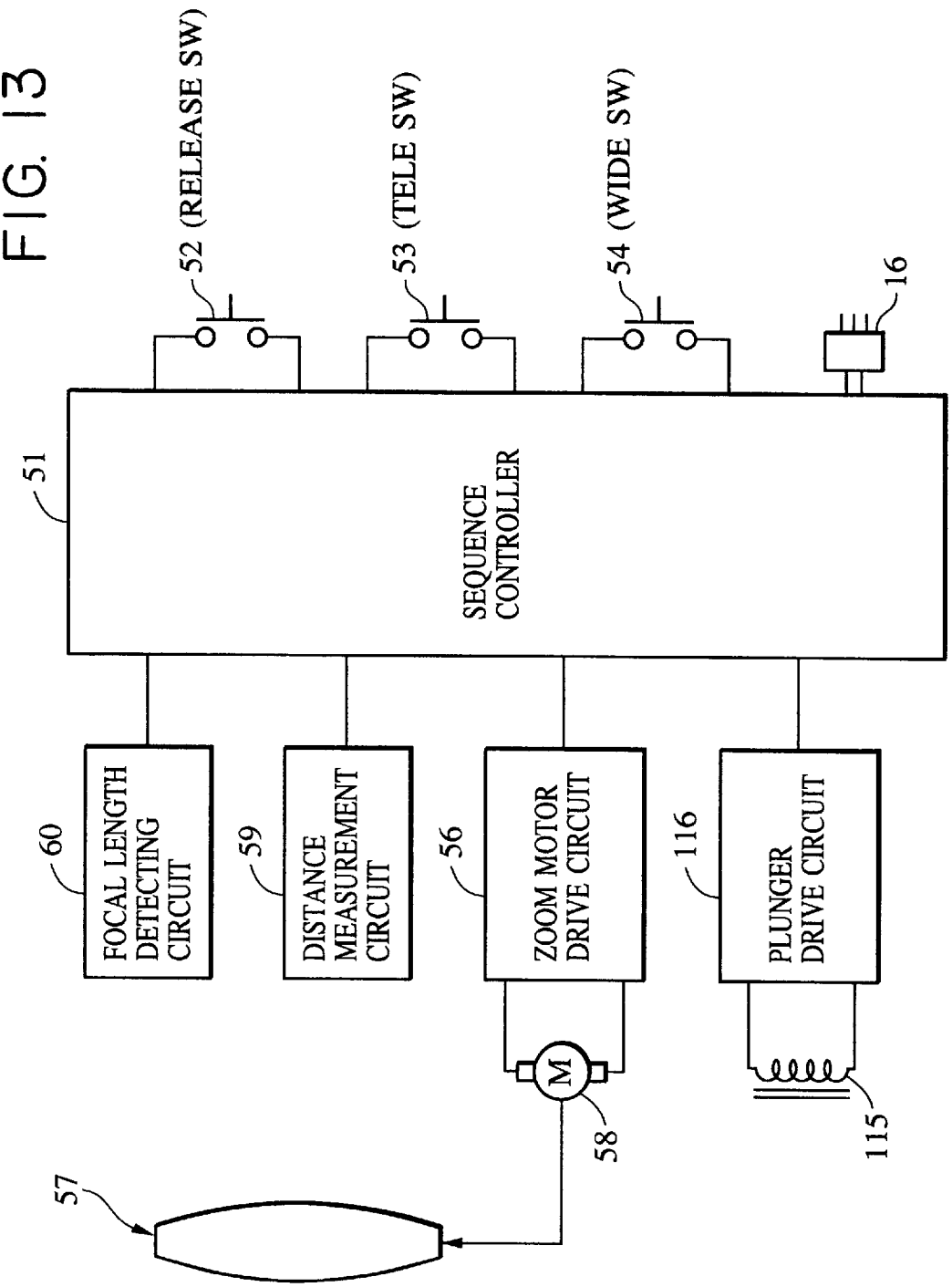
FIG. 13 is a block diagram showing the construction of the main portion of the camera of Embodiment 2 in accordance with the present invention.

FIG. 13 is a block diagram showing the main portion of the camera of Embodiment 2 in accordance with the present invention. Reference numeral 116 denotes a plunger drive circuit for causing forward and backward movement of the plunger 113 by driving the coil 115. The other component parts are the same as those of FIG. 6.

A description will now be given of the operations of the camera having the above-described construction, with reference to the flowchart of FIG. 14.

In Step S201, the sequence controller 51 judges whether or not the TELE switch 53 is turned on. If the switch 53 is on, the operation proceeds to Step S202 to rotate the motor 58 in the forward direction through the zoom motor drive circuit 56. This causes the motor 58 to generate power which is transmitted to a lens barrel through the gears 102, 103, 104, 105, etc., to thereby start driving of the photographic lens 57 in the TELE direction. Here, the zoom lens 41 is also moved mechanically with the movement of the photographic lens 57 in order to change the finder angle of view to the TELE angle of view. Then, in Step S203, if the TELE switch 53 is on, the operation returns back to Step S202 to continue the driving of the photographic lens 57 in the TELE direction. Thereafter, when a detection is made that the TELE switch 53 is off, the operation proceeds from Step S203 to Step S204 in order to detect the focal length position of the photographic lens 57 via the focal length detecting circuit 60.

When, in Step S201, the TELE switch 53 is not on, the operation proceeds to Step S205 in order to judge whether or not the WIDE switch 54 is turned on. If the switch 54 is on, the operation proceeds to Step S206 in order to rotate the motor 58 in the reverse direction through the zoom motor drive circuit 56, thereby starting driving of the photographic lens 57 in the WIDE direction. Here, as described above, the zoom lens 41 is moved mechanically with the movement of the photographic lens 57 in order to change the finder angle of view to a wide angle of view. Then, in Step S207, if the WIDE switch is still on, the operation returns back to Step S206 to continue the driving of the photographic lens 57 in the WIDE direction. Thereafter, when a detection is made that the WIDE switch 54 has been turned off, the operation proceeds from Step S207 to Step S208 in order to detect the focal length position of the photographic lens 57 via the focal length detecting circuit 60. At this time, the coil 115 is not energized, so that the gear 104 and the lever 111, and the plunger 113 remain in a condition indicated by broken lines in FIG. 12.

In the next Step S209, if the release switch is not on, the operation returns back to Step S201 in order to repeat the same operations. If, on the other hand, the release switch 52 is on, the operation proceeds to Step S210 in order to measure the distance to the object by the distance measurement circuit 59. The obtained distance to be photographed (object distance) is input into the sequence controller 51. Then, in Step S211, a judgment is made as to whether or not parallax correction is required, based on the focal lengths and the distance to the object to be photographed.

In this case, when the combination of the focal distance and the object distance are such that a projection line from the object distance on the vertical axis and a projection line from the focal length on the horizontal axis meet at a point within area A in FIG. 8, the parallax between the photographic system and the finder system does not affect the photographic operation, thus making it unnecessary to perform parallax correction. (In FIG. 8, the focal length is 40 mm, the object distance is 0.9 m, and the projection lines meet at point X.) Therefore, the operation proceeds from Step S211 to Step S212 in order to perform focusing by moving the photographic lens 57. In the next Step S213, a shutter mechanism (not shown) is operated to execute a photographic operation.

In Step S214, a film-winding motor (not shown) is driven in order to rotate the film-winding spool 31, thereby starting winding of a film (not shown). In this case, it is obvious that the power of the motor 58 can be divided to rotate the film-winding spool 31. When, in Step S215, it is detected that an amount of film corresponding to one frame has been fed by means of a film detecting switch (not shown) of, for example, a known photoreflector for detecting perforations in a film, the operation proceeds to Step S216 in order to stop the rotation of the film-winding motor and thus, end the photographic operations.

When, for example, the combination of the focal length and the object distance are such that a projection line from the object distance on the vertical axis and a projection line from the focal distance meet at a point in area B, parallax correction is required in Step S211. A description of parallax correction is given below when the focal length is 80 mm, the object distance is 0.9 mm, and the projection lines meet at point Y.

In this case, the finder field of view range falls partly outside the photographic range as shown in FIG. 9B, so that the parallax of the finder system must be corrected. Here, the operation proceeds from Step S211 to Step S217 in order to compute the parallax correction amount using the ROM in the sequence controller 51, which pre-stores the relationship between combinations of focal lengths and object distances and the parallax correction amounts. Then, in Step 218, the coil 11 is energized through the plunger drive circuit 116 in order to draw in the plunger 113 into the coil 115.

This causes the lever 111 to rotate counterclockwise around the shaft 110 as center in accordance with the drawing in of the plunger 113, causing the gear 104 to disengage the gear 105 and engage the stepped gear 23, as shown in FIG. 12.

In Step S219, when the gear 104 and the stepped gear 23 are in engagement, as described above, the motor 58 is rotated counterclockwise via the motor drive circuit 56, and as in Embodiment 1, the cam gear 21 is rotated to shift the lens holder 11 in a direction which allows parallax correction. Then, in Step S220, when it is detected that the cam pin 11c has arrived at a point which corresponds to the desired amount of parallax, the operation proceeds to Step S221 in order to stop the rotation of the motor 58 through the motor drive circuit 56 to thereby stop the shifting of the objective lens 1, as a result of which the parallax correction ends.

In Step S222, the photographic lens 57 is moved to perform focusing, and then in Step S223, a shutter mechanism (not shown) is operated to execute a photographic operation. Thereafter, in Steps S224 to S226, as in Embodiment 1, the motor 58 is rotated once again in order to return the lens holder 11 to the position before parallax correction.

Upon completion, the operation proceeds to Step S227 in order to de-energize the coil 115. This causes the plunger 113 to move the coil 115 out in accordance with the biasing of the spring 114, causing the lever 111 to revolve clockwise around the shaft 110 as center in accordance with the biasing of the spring 112, so that the gear 104 disengages the stepped gear 23 and engages once again the gear 105 as it did initially.

Thereafter, the operation proceeds to the aforementioned Step S214 in order to drive a film-winding motor (not shown) to rotate the film-winding spool 31, whereby winding of a film (not shown) is started. In Step S215, when a detection is made that an amount of film corresponding to one frame has been fed by means of a film detecting switch (not shown) of, for example, a photoreflector used for detecting the perforations of the film, the operation proceeds to Step S216 in order to stop the rotation of the film-winding motor and to thereby stop the photographic operations.

According to Embodiment 2, even if the construction is such as to correct parallax by dividing the power from a camera in which the motor which performs photographic preparation operations (zooming operation in the foregoing description) by rotating in the forward and reverse directions, the amount of rotation of the cam gear 21, that is, the amount of shifting of the objective lens 1, can be determined based on the focal lengths and the object distance, so that the parallax occurring as the finder magnification changes and the parallax occurring as the distance to the object to be photographed changes can be corrected at the same time.

In addition, power is received from the motor 58 by means of the planetary mechanism, which eliminates the need for a power source provided specially for parallax correction, and reduces the amount of space required.

Further, Embodiment 1 can be applied only to cameras which require at least two motors for film winding and for lens barrel zooming, whereas Embodiment 2 can be applied to cameras such as those in which the motor 58 alone is used for lens barrel zooming and film feeding by dividing the power, as described above, so that the range of application is increased.

In the present embodiment, the number of gear steps, the number of gears, the linking method, the method of dividing the power, etc., are not limited to those mentioned above, so that any number of gear steps, number of gears, etc., may be used according to the camera layout, with the same effects still produced.

Figure 15:
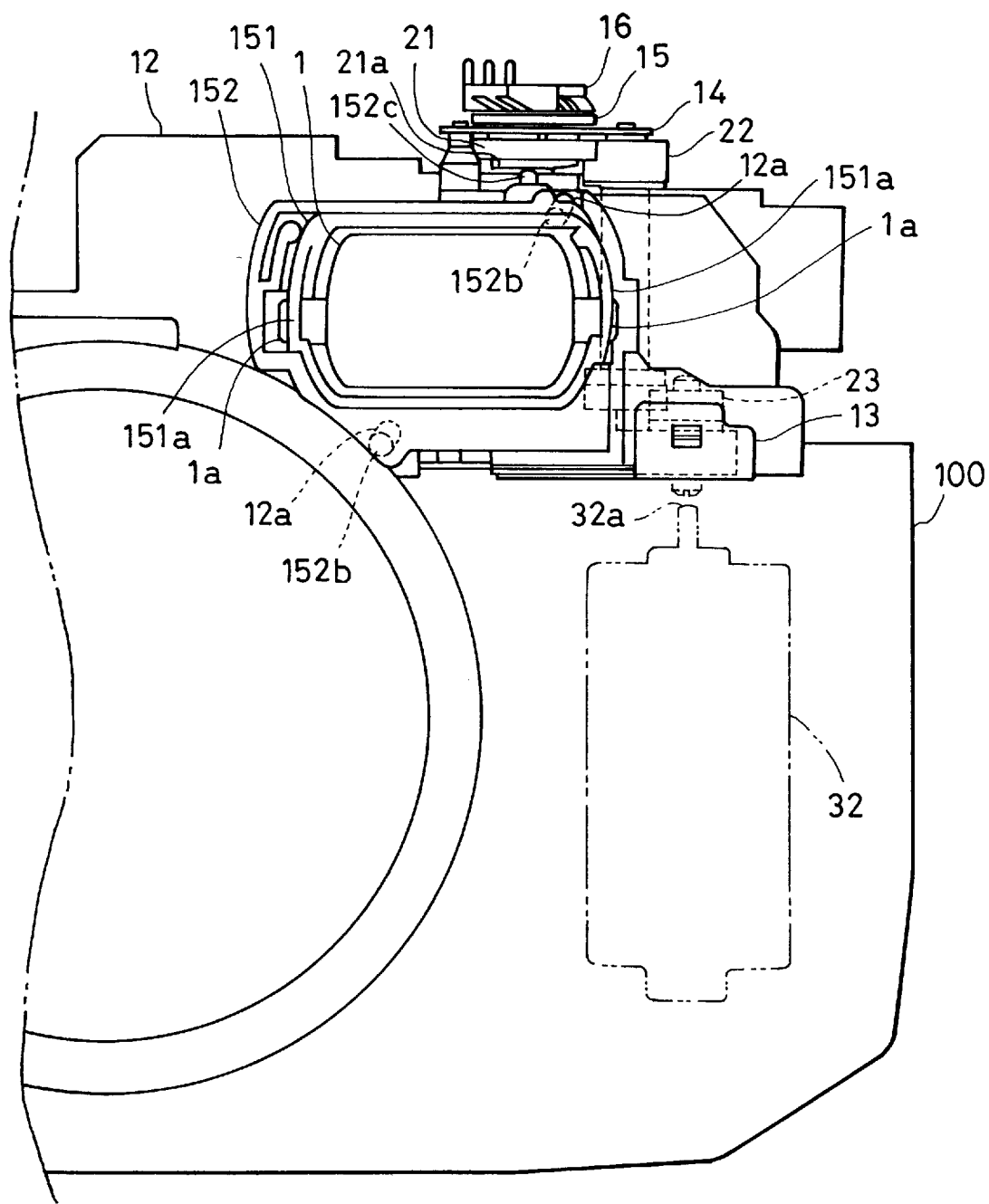
FIG. 15 is a structural front elevational view of the main portion of a camera of Embodiment 3 in accordance with the present invention.
Figure 16:
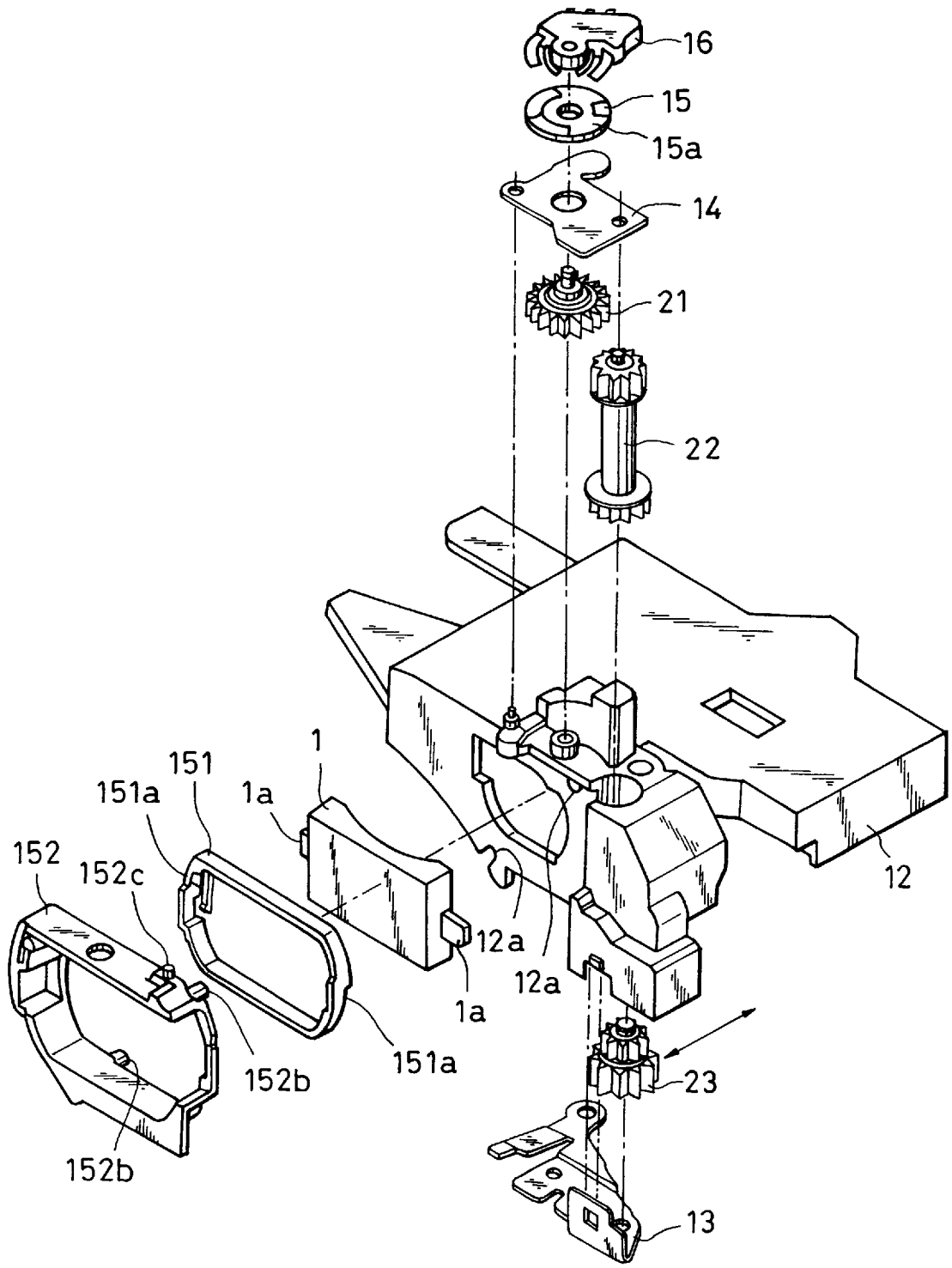
FIG. 16 is a structural perspective view of the main portion of the camera of Embodiment 3 in accordance with the present invention.

FIGS. 15 and 16 are views showing the main portions of a camera of Embodiment 3 in accordance with the present invention. Corresponding parts to those of Embodiments 1 and 2 are given the same reference numerals, and will not be described below.

The construction in Embodiment 3 is the same, except that the lens holder 11 of Embodiment 1 and Embodiment 2 is such as to comprise two parts, an inner holder 151 and an outer holder 152.

Ordinarily, in order to accommodate manufacturing errors of the lenses, some of the lenses of the objective lens system are moved along a plane extending in the X direction and a plane extending in the Y direction, or in the direction of the optical axis and in a direction perpendicular thereto, for adjustment of dioptric power and parallax.

By a tool (not shown), the objective lens 1 is moved within planes extending in the X and Y directions in FIG. 15 for parallax adjustment. A pair of flanges 1a, which are provided on the objective lens 1, are secured to lens receiving portions 151a of the inner holder 151. Then, the inner holder 151 is moved into and back out of the outer holder 152 in the direction of the optical axis in order to adjust the dioptric power. The inner holder 151 is secured to the outer holder 152 using an adhesive or the like such that they can move integrally with each other.

Parallax can be corrected by shifting the outer holder 152 upward and toward the right in FIG. 15 along the guide groove 12a in the finder base 12, since the outer holder 152 is provided with a guide protrusion 152b.

The outer holder 152 is provided with a guide pin 152c in contact with the cam surface of the cam gear 21. Accordingly, the lens holder functions similarly to the lens holder 11 of Embodiments 1 and 2, thus permitting parallax to be corrected by operations similar to those described above. More specifically, the present embodiment makes it possible to correct parallax as effectively as in the foregoing embodiments, and to adjust the dioptric power and parallax in the finder unit.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although in the above-described embodiments, the main purpose was to correct parallax produced as the finder magnification changes as well as parallax produced as the distance to be photographed changes, the constructions of the present invention are applicable to a case in which only one of the parallax types needs to be corrected. Therefore, the invention is not limited in its application to a zoom camera, and may be effectively applied to a camera with a single focal point or a camera with a plurality of focal points.

Although in the foregoing description, the holding member is moved in the direction of the optical axis and in a direction perpendicular thereto by biasing the lens holder 11 or the holding member formed by an inner holder 151 and an outer holder 152 and rotating the cam gear 21, the holder member may also be moved in the direction of the optical axis and in a direction perpendicular thereto by moving the holding member along a cam groove or by means of a combination of a rack and a pinion.

Although in the foregoing description, a film feeding motor or a zoom driving motor were used as the drive source for correcting parallax, other types of drive sources may be used. They include a motor used for focusing, a motor for cartridge loading, and a motor for opening and closing a cover. Further, the drive source for correcting parallax can use any drive source other than a motor such a piezoelectric device for driving another operating device.

Although in the foregoing description, finder parallax correction and operations for returning the finder to its initial position were performed using drive power produced by rotation in one and the same direction, the finder can be returned to its initial position before parallax correction by drive power produced by rotation in the opposite direction by allowing, as in the above-described Embodiment 2, transmission of drive power produced by rotation in the opposite direction.

Although in the foregoing description, finder parallax correction was performed after operation of the shutter release member, the correction may be performed after zooming or the like.

The present invention may also be applied to a camera using an image recording medium other than a film.

The software configuration and the hardware configuration in the foregoing description may be varied.

According to the present invention, the features of each of the embodiments and modifications thereof, and technical features thereof may be combined as desired.

According to the present invention, the entire or part of the structures defined in the claims and the embodiments may form one apparatus, or may be connected to another apparatus, or may form an element of an apparatus.

The present invention may be applied to various cameras, such as a single-lens reflex camera, a lens shutter camera, or a video camera. The invention may also be applied to, for example, an optical apparatus other than a camera. Further, the invention may be applied to an apparatus applied to a camera or an optical apparatus, or may be applied to main component parts of these apparatuses.

What is claimed is:

1. A camera comprising:
   a finder which can correct parallax;
   a first drive power transmission system for transmitting drive power to said finder for correcting the parallax;
   an operating device which operates said camera;
   a second drive power transmission system for transmitting drive power to said operating device for operating said operating device;
   a determination device for determining conditions of said camera; and
   a drive power supplying device for selectively supplying drive power to said first drive power transmission system and said second drive power transmission system in accordance with the conditions determined by said determination device.

2. A camera according to claim 1, wherein said finder includes a parallax correction optical unit which is moved by the drive power transmitted from said first drive power transmission system.

3. A camera according to claim 1, wherein said finder includes a parallax correction optical unit which is moved by the drive power transmitted from said first drive power transmission system in a direction perpendicular to a direction of an optical axis of said finder.

4. A camera according to claim 1, wherein said operating device includes an image recording medium transporting device.

5. A camera according to claim 1, wherein said operating device includes a film transporting device.

6. A camera-according to claim 1, wherein said operating device includes a device for operating an optical unit.

7. A camera according to claim 1, wherein said operating device includes a device for operating a photographic optical unit.

8. A camera according to claim 1, wherein said operating device includes a device for changing the focal length of an optical system.

9. A camera according to claim 1, wherein said drive power supplying device includes a motor.

10. A camera according to claim 1, wherein said drive power supplying device includes a planetary clutch device.

11. A camera according to claim 1, further comprising a controller for controlling the parallax correction of said finder driven by said first drive power transmission system in accordance with a change in a distance to an object to be photographed.

12. A camera according to claim 1, further comprising a controller for controlling the parallax correction of said finder driven by said first drive power transmission system in accordance with a change in magnification of said finder.

13. A camera according to claim 1, further comprising a controller for controlling the parallax correction of said finder driven by said first drive power transmission system in accordance with a change in a distance to an object to be photographed and a change in magnification of said finder.

14. A parallax correcting apparatus comprising:
- a first drive power transmission system for transmitting drive power for correcting parallax to a finder;
- a second drive power transmission system for transmitting drive power to an operating device for operating said operating device;
- a determination device for determining conditions of said apparatus; and
- a drive power supplying device for selectively supplying drive power to said first drive power transmission system and said second drive power transmission system in accordance with the conditions determined by said determination device.

15. A parallax correcting apparatus according to claim 14, further comprising said finder which corrects parallax by the drive power transmitted from said first drive power transmission system.

16. A parallax correcting apparatus according to claim 15, wherein said finder includes a parallax correction optical unit which is moved by the drive power transmitted from said first drive power transmission system.

17. A parallax correcting apparatus according to claim 15, wherein said finder includes a parallax correction optical unit which is moved by the drive power transmitted by said first drive power transmission system in a direction perpendicular to a direction of an optical axis of said finder.

18. A parallax correcting apparatus according to claim 14, further comprising said operating device which operates by the drive power transmitted from said second drive power transmission system.

19. A parallax correcting apparatus according to claim 18, wherein said operating device includes an image recording medium transporting device.

20. A parallax correcting apparatus according to claim 18, wherein said operating device includes a film transporting device.

21. A parallax correcting apparatus according to claim 18, where in said operating device includes a device for operating an optical unit.

22. A parallax correcting apparatus according to claim 18, wherein said operating device includes a device for operating a photographic optical unit.

23. A parallax correcting apparatus according to claim 18, wherein said operating device includes a device for changing the focal length of an optical system.

24. A parallax correcting apparatus according to claim 14, wherein said drive power supplying device includes a motor.

25. A parallax correcting apparatus according to claim 14, wherein said drive power supplying device includes a planetary clutch device.

26. A parallax correcting apparatus according to claim 14, further comprising said finder and a controller for controlling the parallax correction of said finder driven by said first drive power transmission system in accordance with a change in distance to an object to be photographed.

27. A parallax correcting apparatus according to claim 14, further comprising said finder and a controller for controlling the parallax correction of said finder driven by said first drive power transmission system in accordance with a change in magnification of said finder.

28. A parallax correcting apparatus according to claim 14, further comprising said finder and a controller for controlling the parallax correction of said finder driven by said first drive power transmission system in accordance with a change in a distance to an object to be photographed and a change in magnification of said finder.

\* \* \* \* \*

UNITED STATES PATENT AND TRADEMARK OFFICE
CERTIFICATE OF CORRECTION

PATENT NO. : 5,875,361

DATED : February 23, 1999

INVENTOR(S) : Goro NOTO

It is certified that error appears in the above-identified patent and that said Letters Patent is hereby corrected as shown below:

COLUMN 13:

Line 9, "camera-according" should read --camera according--.

COLUMN 14:

Line 21, "where in" should read --wherein--.

Signed and Sealed this

Tenth Day of October, 2000

Attest:

Q. TODD DICKINSON

Attesting Officer

Director of Patents and Trademarks